United States Patent [19]
Tiemann

[11] Patent Number: 4,787,310

[45] Date of Patent: Nov. 29, 1988

[54] APPARATUS FOR DECORATING ARTICLES

[75] Inventor: Gerhard Tiemann, Löhne, Fed. Rep. of Germany

[73] Assignee: Werner Kammann Maschinenfabrik GmbH, Bunde, Fed. Rep. of Germany

[21] Appl. No.: 115,121

[22] Filed: Oct. 29, 1987

[30] Foreign Application Priority Data

Nov. 5, 1986 [DE] Fed. Rep. of Germany ....... 3637638

[51] Int. Cl.⁴ ...................... B41F 17/22; B65G 25/00
[52] U.S. Cl. .................................... 101/40; 198/468.2
[58] Field of Search ............................. 198/468.2, 775; 414/753, 752; 101/38 R, 38 A, 39, 40, 35, 126, 124

[56] References Cited

U.S. PATENT DOCUMENTS

| | | | |
|---|---|---|---|
| 3,075,651 | 1/1963 | Kaden | 198/468.2 X |
| 3,159,100 | 12/1964 | Marquiss | 198/468.2 X |
| 4,326,625 | 4/1982 | Murzin et al. | 198/468.2 |
| 4,398,627 | 8/1983 | Saccani | 198/775 X |
| 4,712,474 | 12/1987 | Moter | 101/38 A |

FOREIGN PATENT DOCUMENTS

| | | | |
|---|---|---|---|
| 095987 | 12/1983 | European Pat. Off. | |
| 1527476 | 5/1970 | Fed. Rep. of Germany | ... 198/468.2 |
| 2417373 | 10/1974 | Fed. Rep. of Germany | ... 101/38 A |
| 2530360 | 1/1977 | Fed. Rep. of Germany | ... 101/38 A |
| 3330927 | 3/1985 | Fed. Rep. of Germany | . |

*Primary Examiner*—Clifford D. Crowder
*Attorney, Agent, or Firm*—Panitch, Schwarze, Jacobs & Nadel

[57] ABSTRACT

An apparatus for decorating articles such as bottles by means of labelling, printing thereon or the like includes a plurality of operating stations for performing various working operations on the articles as they are successively moved through the apparatus, transportation means for transporting the articles in a batch-wise manner from one operating station to the next and holding means for holding the articles in the stations between the transportation stepping movements. The transportation means comprises a main support member which is arranged to perform a reciprocating pivotal movement and on which holding elements such as grippers are pivotably carried. The pivotal movements of the main member and the holding elements take place in the same plane or in mutually parallel planes in such a way that the stroke movements of the main member and the holding elements are added together to make up the total length of movement to be covered by the articles in moving from one station to another.

20 Claims, 11 Drawing Sheets

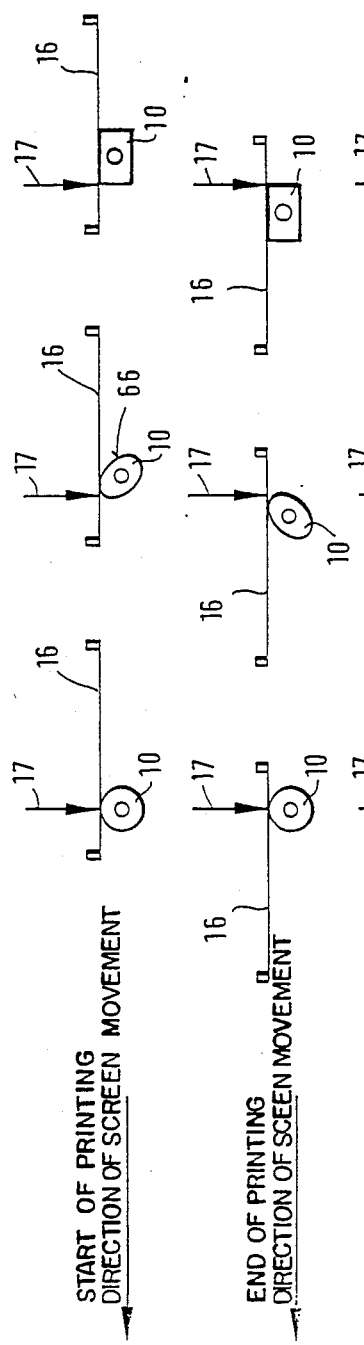

APPARATUS FOR DECORATING ARTICLES

BACKGROUND OF THE INVENTION

The invention relates generally to an apparatus for decorating articles such as bottles, for example by applying a label thereto or by printing thereon.

In one form of apparatus for decorating articles, as disclosed for example in German laid-open application (DE-OS) No 25 30 360, the design layout is such that the apparatus comprises at least a first station and at least a second station, together with a holding arrangement which carries the articles in the stations of the apparatus. At least one station is provided with at least one means for applying decoration to a respective article, while the holding arrangement for holding the articles is provided with holding elements which are arranged in respective pairs and which can be reciprocated parallel to the longitudinal axis thereof. The holdign elements, co-operating in pairs, form at least two holder devices for the articles which are advanced in a batch-wise manner from one station to another station which is at a spacing from the first-mentioned station in the direction of transportation movement of the articles. The holding arrangement also serves at the same time as the transportation apparatus for advancing the articles from one station to another. In other words, the holding arrangement has to perform two functions, on the one hand carrying the articles in the individual stations in which some treatment operations are generally carried out on the articles in question, and also transporting the articles from one station to the next.

SUMMARY OF THE INVENTION

An object of the present invention is to provide an apparatus for decorating articles which is such as to provide an enhanced through-put capacity, more particularly by providing for more rapid transportation of the articles therethrough.

Another object of the invention is to provide an apparatus for decorating articles, irrespective of the cross-sectional shape thereof, to provide enhanced versatility in respect of the articles to be decorated in the apparatus.

Another object of the invention is to provide an apparatus for decorating articles which is of such a layout that the plane in which the decoration operation takes place does not need to be altered in regard to its heightwise position in order to adapt the apparatus to varying article configurations and dimensions.

Still another object of the invention is to provide an article decorating apparatus in which, if necessary, the individual articles can be held firmly throughout the entire period of time for which they are passing through the apparatus, such that the articles are always in a defined and predeterminable angular position and alterations therein in the course of transportation and processing in the individual stations of the apparatus can also be clearly defined and predetermined.

In according with the present invention, these and other objects are achieved by an apparatus for decorating articles, comprising at least a first station and at least a second station, and a holding arrangement for carrying the articles in the respective stations. At least one said station is provided with at least one means for applying decoration to the articles, and the holding arrangement comprises holding members which are disposed in pairs, being reciprocatable parallel to the longitudinal axis thereof and co-operating in pairs to form holding means for the articles. For transporting the articles from one station to another through the apparatus in a given direction of transportation movement, the apparatus includes a transporting means comprising at least one main support member which is arranged pivotably in a plane substantially perpendicular to the longitudinal axis of the articles carried by the respective pairs of holding members. The main support member is provided with at least one carrier element which is mounted on the main support member pivotably in the plane of pivotal movement thereof and which projects therefrom towards the holding arrangement. The stroke movement of the main support member, in the direction of article transportation in the apparatus, and the stroke movement of the carrier element, supplement each other to provide a travel distance by which the respective article is advanced from a first station in which it is carried by a holder device of the holding arrangement, to a second station which is disposed at a spacing from the first-mentioned station and in which it is carried by another holder device.

The apparatus in accordance with the present invention therefore provides a specific transportation means for transporting the articles through the apparatus, the speed of the transportation means not being dependent on the speed at which any parts of the holding arrangement for carrying the articles are moved. It will be appreciated that, in the previous forms of apparatus, the movements of the holding arrangement and the movements of the transporting means had to be matched to each other insofar as the individual holder devices carrying the articles could not be opened before the articles had been taken over for the next transportation step from the respectively associated carrier elements. Conversely, the carrier element can only release an article which is in one station after it has been gripped by the holder device associated with that station. However, between that change in the articles from the holding arrangement to the transporting means and vice-versa, the two assemblies can move independently of each other and can thus be adapted in respect of speed and sequence of movements to the respective function to be performed. As the distance covered by a given article during a transportation stepping movement is the combination of two stroke movements, namely that of the main support member and that of the carrier element, both those components can perform a stroke movement which in each case is shorter than the total distance covered by the article during a transportation stepping movement; in other words, for a given speed of operation, the apparatus runs more smoothly than the previous apparatus in which the holding arrangement which also served at the same time for transporting the articles had to perform a stroke movement corresponding to the length of the transportation stepping movement by which the article was moved between two stations.

For the purpose of adapting the transporting means to different article shapes and dimensions as well as different lengths in the peripheral direction of the decoration such as printing or a label to be applied to the articles, an advantageous embodiment of the invention provides that the stroke movement of the main support member and/or the carrier element is adjustable. In that way, the plane in which the decoration in question such as printing or a label is applied to an article does not have to be adjusted for the purposes of adaptation to the respective articles in a plane perpendicular to the longitudinal axis of the article when carried in a holder device of the holding arrangement.

In accordance with another feature of the invention, operatively associated with the main support member of the transportation means is at least one control element which is connected to at least one of the carrier elements on the main support member and which can be displaced relative to the latter and which serves to control the pivotal movements of the carrier elements in dependence on the pivotal movements of the main support member.

By virtue of the pivotal movement performed by the carrier element during the transportation step, the article carried by that carrier element undergoes a corresponding pivotal displacement which results in a change in the absolute angular position of the article. When dealing with articles which are substantially elliptical or oval in cross-section, that change in angular position thereof can be utilised, by suitable selection of the magnitude of the pivotal movement performed by the carrier element, to transfer the article at the end of a transportation step in one position to the holder device in a station which corresponds to the position of the article at the beginning of the treatment operation which is to be carried out on the article following that transportation step and during which the article is carried by the holding means. Similarly, the carrier element, before the commencement of a transportation step, can take over the article in one position from the holder device which corresponds to the position of the article at the end of the treatment operation which precedes that transportation step and during which the article is carried by the holding means. That is a particular advantage of the transportation means in accordance with the present invention as there is no need for the additional steps which are necessary in the case of the previous apparatus, for moving the article initially into the starting position required for the decoration operation, before the termination of the actual transportation step and the commencement of the decoration operation. A similar point also applies in regard to the additional step after termination of the decoration operation, whereby the article has to be moved from the position at the end of the decoration operation into an angular position in which it can be taken over by the transportation means for carrying out the following step in the transportation movement of the article through the apparatus. A similar point also applies in regard to other treatment operations, for example a flame treatment or drying operation, in which the article occupies given starting and finishing positions.

A particularly advantageous construction of the apparatus in accordance with the invention is one in which the main support member is in the form of a beam or bar on which the holding means formed by the carrier elements are mounted. The holding means may be in the form of grippers, in which case it is necessary to provide particular means for opening and closing the grippers. Making the holding means in the form of grippers give the advantage that it is possible in that way to ensure in a particularly simple manner that the articles can remain in a relative angular position once they have been put into that position, for example at the beginning of the transportation movement in the apparatus, so that it is then no longer necessary, once the article has first been properly aligned at the beginning of the transportation movement, for the article to be subjected to further additional intermediate aligning operations in the course of further transportation thereof.

It is however also possible for the holding means or carrier elements to be in the form of a vacuum holding means. Although that requires each holding means to be provided with a conduit for connecting the surface of the vacuum holding means which receives the article to a reduced pressure source, on the other hand that arrangement does not require any means for opening and closing the grippers. Control of the reduced pressure for holding the articles in place by a suction effect and for releasing the articles can be effected using simple means, especially as a single common control arrangement for all the vacuum holders will generally be sufficient, when the apparatus includes a plurality of such holders.

It will be appreciated that, when using a vacuum holder configuration, it is also necessary to provide a control element for controlling the pivotal movement of the respective vacuum holder devices. The use of a bar or rail as the control element has been found to be particularly advantageous, including the arrangement in which the holding means are in the form of grippers. Irrespective of the nature and configuration of the holding means, the arrangement may be such that all the holding means which are to be controlled by the control rail or bar are provided at their side remote from the holder arrangement with a projection portion which is pivotably connected to the control rail or bar which is in turn connected to at least one control rod which is mounted pivotably and longitudinally slidably.

When using holding means in the form of grippers, the grippers are advantageously provided with a support body which carries first and second gripper jaws and which is mounted pivotably on the associated main support member of the transportation arrangement, that is to say for example on the above-mentioned carrier beam or bar, being pivotable in a plane parallel to the plane of movement thereof. With its end remote from the article to be transported, the abovementioned support body is mounted to the control rail or bar pivotably relative thereto and carries two mutually intermeshing gears, each of which is associated with a respective one of the first and second gripper jaws, and a double-armed lever which is non-rotatably connected to the shaft of one of the first and second gears is connected with one arm pivotably to a second control rail or bar and with the other arm to one of the first and second gripper jaws, while the second gear is pivotably connected to the second gripper jaw by way of an arm which is non-rotatably connected to the shaft carrying the second gear. In that case the arrangement may be such that the end remote from the gripper jaws of the arm which is pivotably connected to the second control rail or bar is of a forked configuration, and an entrainment portion arranged on the second control rail or bar engages into the fork. Another possible design configuration is for the end of that arm to be provided with a toothed segment meshing with a toothed rack which performs the function of the second control rail or bar.

An embodiment of the apparatus in accordance with the invention which has been found to be highly advantageous is one in which the main support member is adapted to perform a reciprocating movement along a curved path whose apex is the point on the path which is furthest away from the plane in which the holder devices are arranged, while the pivotal movement of the carrier element is adapted to the pivotal movement of the main support member in such a way that the change in position of the carrier element perpendicularly to the plane of the holder devices during the pivotal movements is at least partly compensated by an opposite change in the position of the main support member. In other words, when the main support member and the carrier element perform their pivotal movements in a plane which is for example vertical and the carrier element projects upwardly beyond the main support member, the displacement of the article carried thereby, which is in an upward direction in the course of the pivotal movement of the carrier element, is compensated by the simultaneous movement of the main support member in the opposite direction, being therefore downwardly in that case as outlined above. That can provide that the article follows a path between two stations, which differs only slightly from a linear path and which is desirably curved in such a way that the apex of that path is the point on the path which is furthest away from the plane in which the decoration operation is carried out.

The holding arrangement for carrying the articles in the apparatus is advantageously such as to have two holding bars which extend substantially parallel to the main support member carrying the carrier element, with the holding members being arranged at the mutually facing sides of the holding bars. With the vertical arrangement of the apparatus as referred to above, the holding bars may be disposed above the main support member which carries the carrier elements. It is also possible however for the holding bars to be disposed laterally beside the main support member. That will generally be the case when the articles to be decorated are transported through and decorated by the apparatus, while they are in a standing position, that is to say with their longitudinal axis extending at least substantially vertically.

Further objects, features and advantages of the present invention will be apparent from the following description of preferred embodiments thereof.

DESCRIPTION OF THE PREFERRED EMBODIMENTS

Figure 1:
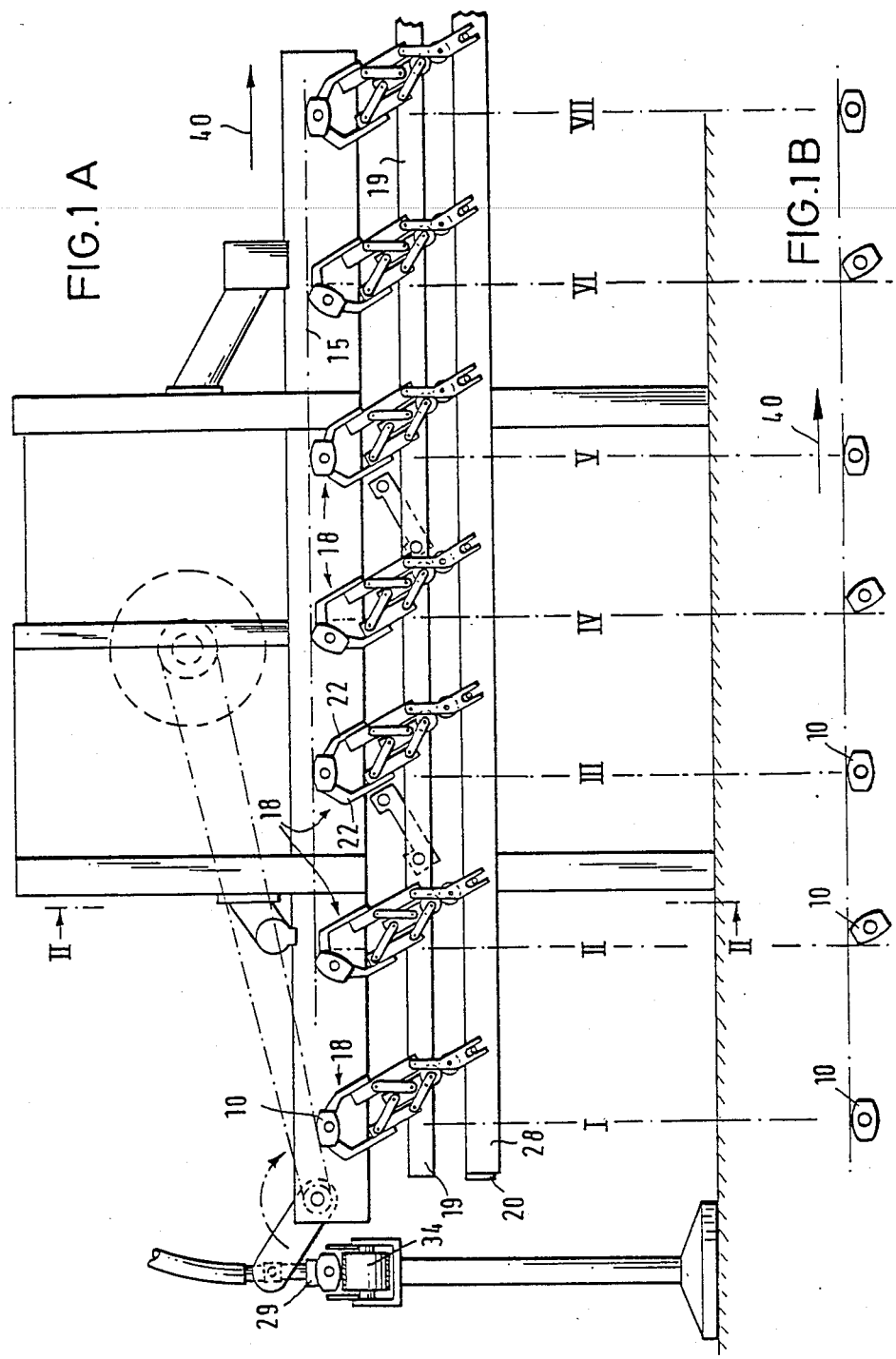
FIG. 1A is a diagrammatic side view of an apparatus for decorating articles which are approximately elliptical in cross-section, using a screen printing process, wherein the co-operating components occupy the position prior to the commencement of a transportation step.
FIG. 1B is a view corresponding to that shown in FIG. 1A, which only shows the articles in their position after the termination of a transportation step.

Referring firstly to FIGS. 1 through 8, shown therein is a first embodiment of an apparatus in accordance with the present invention, for decorating articles in the form of bottles 10 which are of an elongate configuration and which are of approximately elliptical cross-section. The bottles 10 are carried in the stations of the apparatus in which they are disposed between the transportation steps, by a holding arrangement which is indicated generally at 12 and which is provided with a plurality of holding members 12a and 12b which are disposed in pairs. The co-operating holding members 12a and 12b are of a configuration which is conventional practice when dealing with bottles, such that the holding member 12a accommodates the end portion of the article or bottle 10, at the bottom end thereof, whereas the holding member 12b is of a mandrel-like or bar-like configuration and is introduced into the neck opening of the bottle 10 so that, as long as the bottle 10 is carried by the holding arrangement 12, it is gripped and held between the two holding members 12a and 12b.

Figure 2:
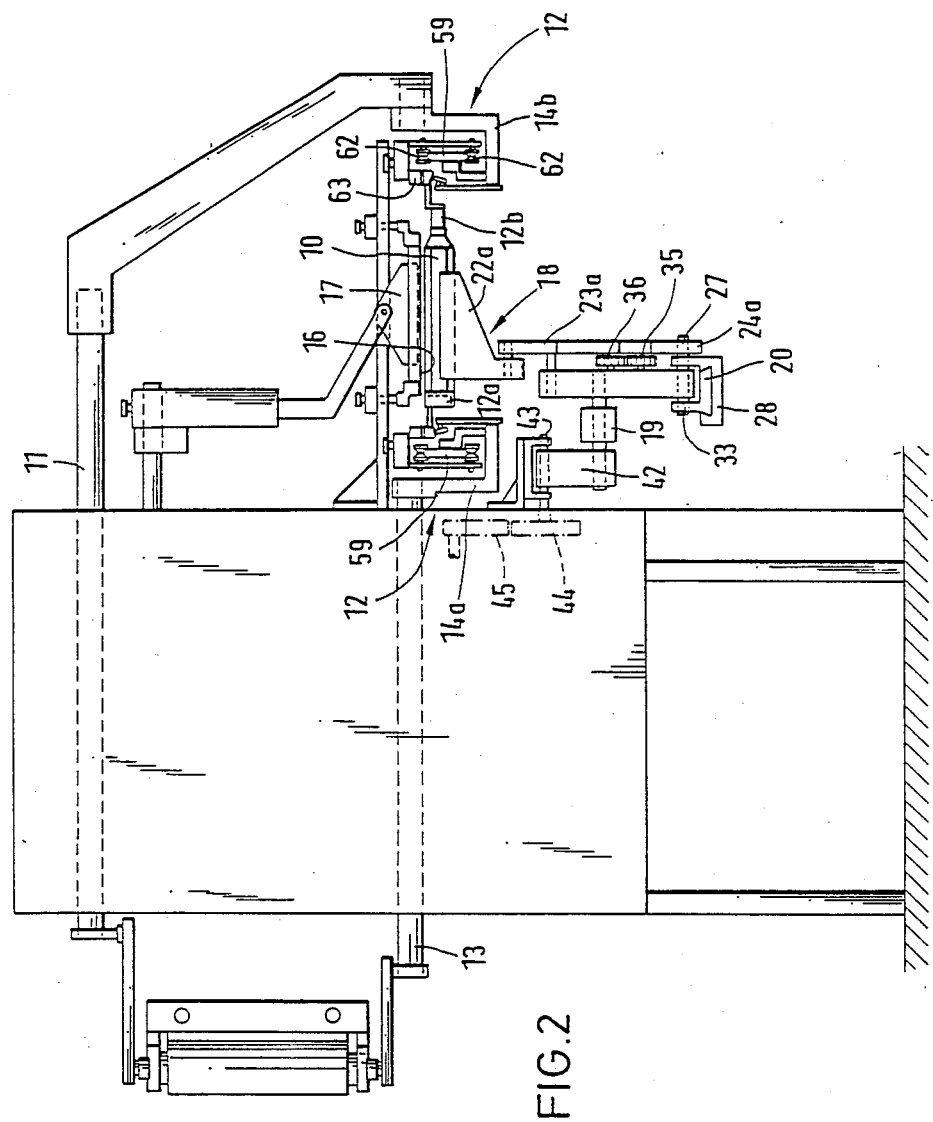
FIG. 2 is a view in section taken along line II—II in FIG. 1, FIGS. 3A–C are diagrammatic views showing successive positions of the co-operating components of the apparatus in the course of a transportation step.
Figure 7:
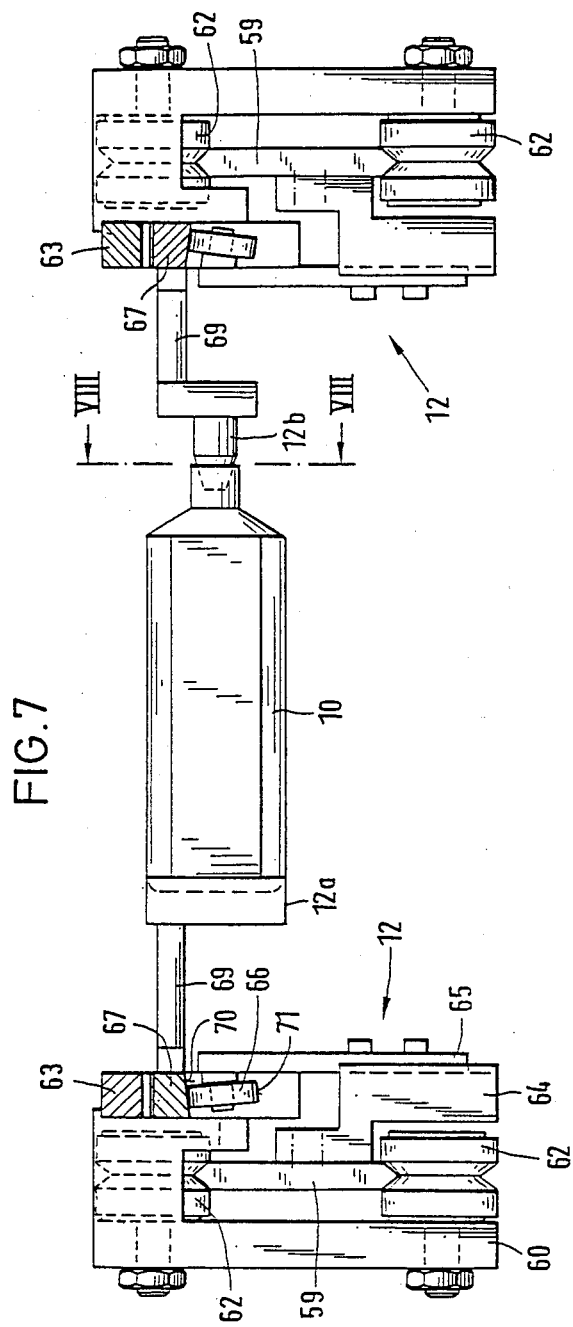
FIG. 7 shows a portion from FIG. 2 on an enlarged scale.

All the holding members 12a are carried, with the interposition of further elements which will be described hereinafter, by a common rail or bar 14a which extends at least over a plurality of stations in the apparatus. The holding members 12b are carried in the same fashion by a rail or bar 14b which extends parallel to the rail or bar 14a and which also extends over a plurality of stations in the apparatus. The two rails or bars 14a and 14b are mounted so as to be reciprocatable transversely with respect to the longitudinal extent thereof so that, in their end position as shown in FIGS. 2 and 7 in which they are at the smallest spacing from each other, the articles 10 in the apparatus are respectively clamped thereby between two cooperating holding members 12a and 12b which jointly form a holder device. The holding members 12a and 12b release the article 10 when they occupy their second end position in which they are at the greatest spacing from each other. The two rails or bars 14a and 14b are reciprocated between the two end positions referred to above by way of respective linkages 11 and 13 connected to a suitable drive means.

Figure 6:
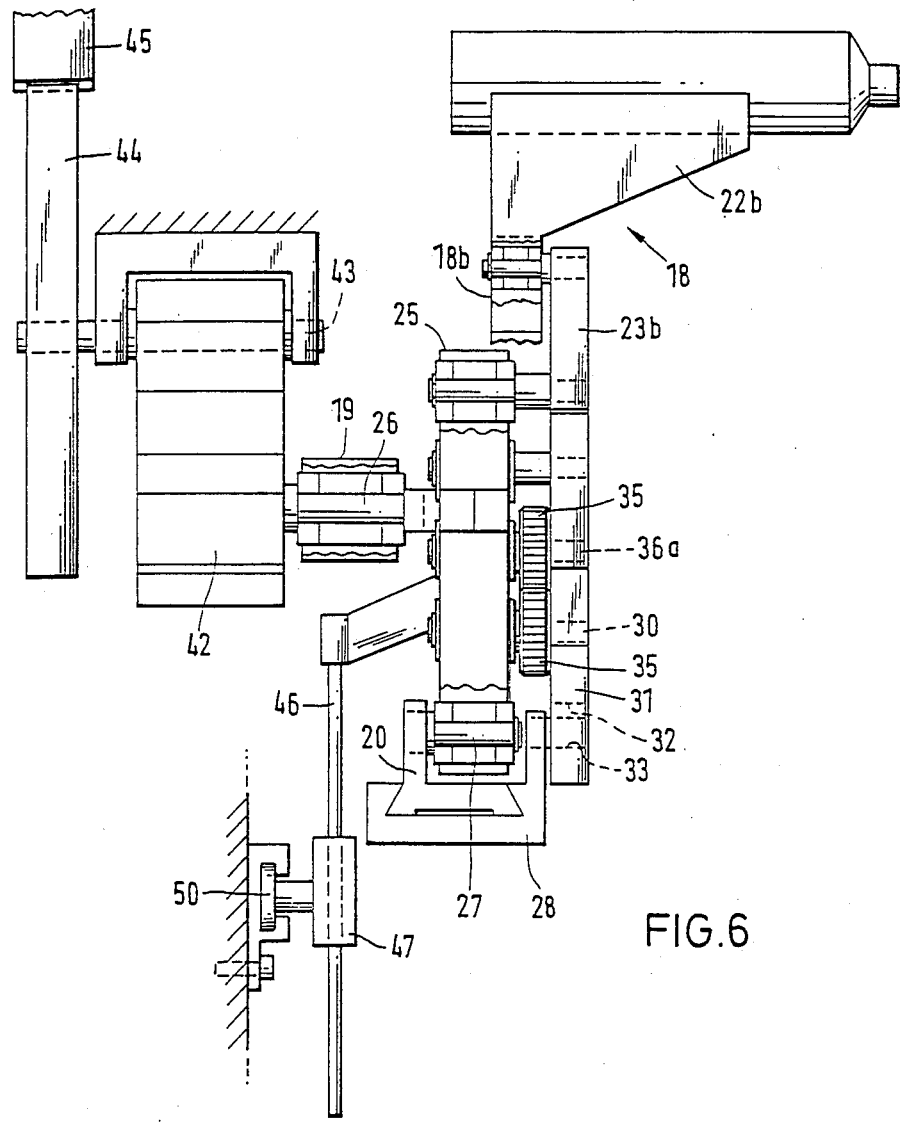
FIG. 6 is a front view of the FIG. 5 gripper.

As the bottles 10 are printed upon in a lying condition, as can be clearly seen for example from FIG. 2 or FIG. 6, the rails or bars 14a and 14b are so arranged that the holding members 12a and 12b with the articles or bottles 10 carried thereby are disposed beneath the plane in which screen printing stencils indicated diagrammatically at 16 are disposed. A squeegee or doctor 17 is operatively associated with each stencil 16 in the usual manner.

The articles 10 are transported from one station to another, independently of the holding arrangement 12, by means of carrier elements which are in the form of grippers 18 and which are arranged below the screen printing plane as indicated at 15, for example in FIG. 1. The grippers 18 are carried by a main support member 19 which is in the form of a beam of bar and which is reciprocatable in such a way that it performs pivotal movements in a vertical plane parallel to the direction in which it extends. The grippers 18 are mounted pivotably to the beam 19, above same, in such a way that they can also be pivoted between two end positions which are disposed at a spacing from each other, in the plane in which the beam 19 performs its reciprocating pivotal movements. The pivotal movements of the grippers are controlled by way of a first control rail or bar 20 which is arranged beneath the beam 19 and parallel thereto.

Each gripper 18 is provided with first and second gripper portions 18a and 19b on which replaceable gripper jaws 22a and 22b are mounted (see FIGS. 5 and 6), which are adapted in respect of their dimensions, shape and relative positions to the dimensions, shape and relative position of the respective article carried thereby. Each of the two gripper members 18a and 18b of each gripper is carried by two parallel links 23a, 24a and 23b, 24b respectively, which on the one hand are pivotably connected to the respective gripper portion 18a and 18b respectively, and on the other hand are pivotably connected to a common main body 25 which in turn is mounted pivotably on the beam 19 in the above-mentioned manner. That is effected by way of a pin 26 which is mounted rotatably in the beam 19 and which is fixedly connected to the main body 25 of the gripper 18.

At its end remote from the gripper jaws 22a and 22b, the main body 25 of each gripper is connected to the control rail or bar 20. That is also done by way of a pin 27 which is fixedly connected to the control rail or bar 20 and which is guided by way of interposed bearing means in the body 25 so that the latter can perform a pivotal movement relative to the pin 27.

The control rail or bar 20 is longitudinally displaceably guided within and relative to a second control rail or bar 28. The purpose and function of the second control rail or bar 28 is to open and close the grippers 18. For that purpose the parallel link 24a which is mounted to the main body 25 pivotably by way of a shaft 30 is provided with an arm 31 whose lower free end is in the form of a fork as indicated at 32 for example in FIG. 5. A pin 33 engages into the fork 32, the pin 33 being fixedly mounted to the second control rail or bar 28. A relative displacement of the second rail or bar 28 relative to the arm 31 of the parallel link 24a results in the arm 31 being entrained by the pin 33 and, as a result, a pivotal movement of the link 24a which is fixedly connected to the arm 31, about the axis of the shaft 30.

Fixedly mounted on the shaft 30 is a gear 35 meshing with a second gear 36 which is fixedly carried on a shaft 37 which is mounted rotatably within the main body 25. One end of the link 24b is connected to the shaft 37. Accordingly a rotary movement of the shaft 30 caused by relative displacement as between the arm 31 and the second control bar 28, by way of the shaft 30, results in a rotary movement of the gear 35 which entrains the gear 36. As the rotary movements of the two gears 35 and 36 are in opposite directions, then while the link 24a is pivoted in the clockwise direction, the link 24b is simultaneously and synchronously pivoted in the opposite direction. The result of those two pivotal movements is that the gripper members 18a and 18b are moved apart so that the gripper 18 is opened. The other two links 23a and 23b are entrained by the movement of the two gripper portions 18a and 18b, which is produced by way of the driven links 24a and 24b. They only serve to ensure that the two gripper portions 18a and 18b are guided in parallel relationship.

Figure 4:
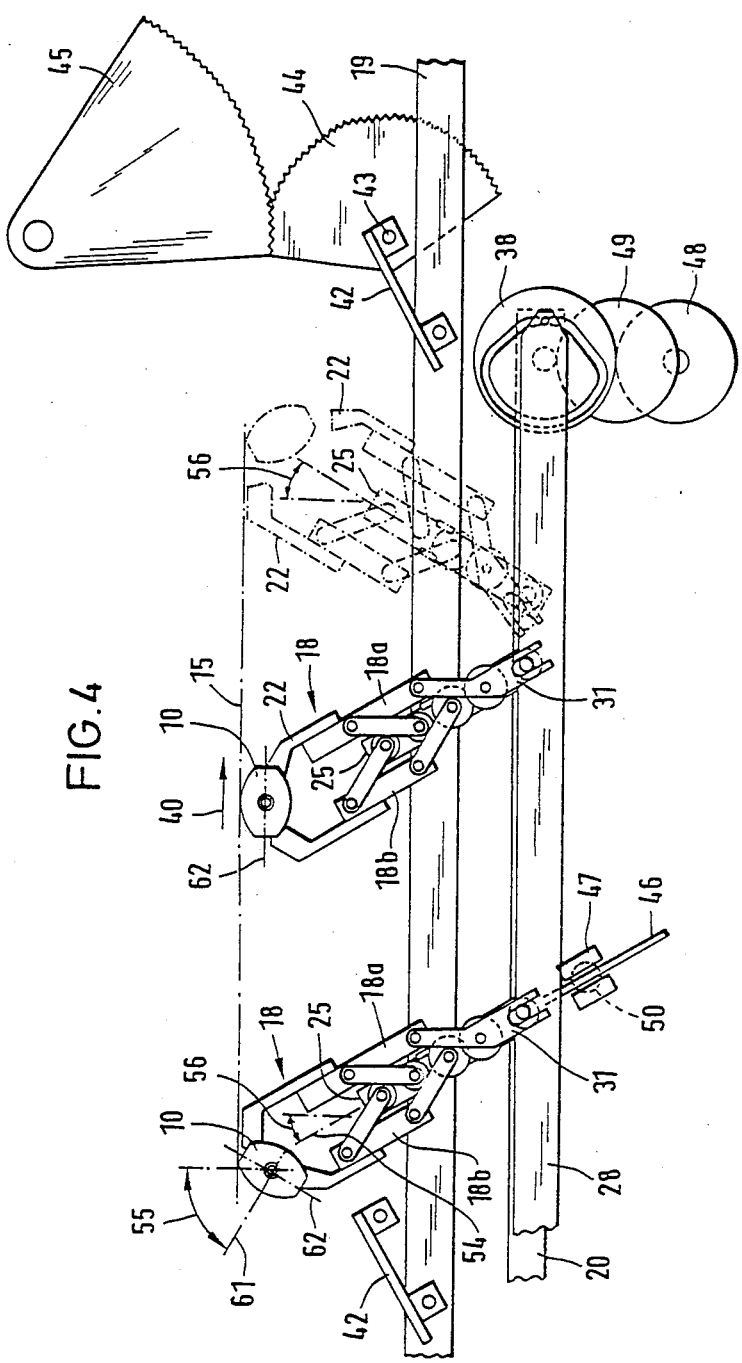
FIG. 4 shows a view of a portion from FIG. 1 on a larger scale.
Figure 5:
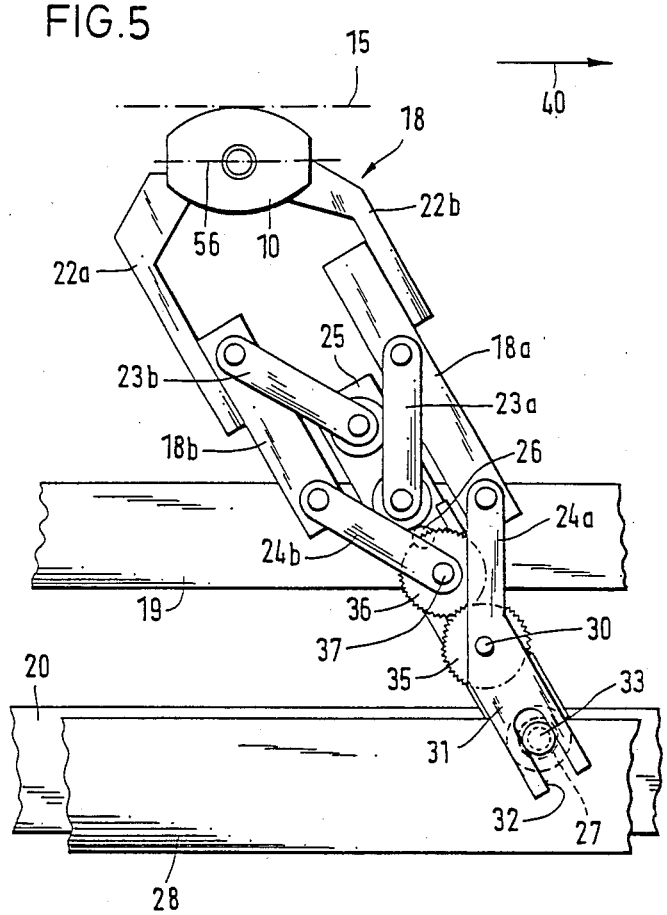
FIG. 5 is a side view of a gripper on a larger scale.

As can be seen for example from FIGS. 2 and 6, the beam 19 is carried by first and second links 42 which are adjustable in respect of their length, for example being telescopic for that purpose. Each of the links 42 is connected pivotably to the beam 19, by way of its one end, while by way of its respective other end it is connected to a shaft 43 on which a toothed segment 44 is fixedly disposed, the segment 44 being driven by a further toothed segment 45, as can be seen in FIG. 4. A common drive means is operatively associated with the two toothed segments 45 of the two link members 42. For reasons of clarity of the drawings, the toothed segments of the left-hand link member 42 and the drive means are not illustrated in the drawings. The heightwise position and the stroke movement of the beam 19 can be adapted to the respective requirements involved by adjusting the length of the link members 42.

The control rail or bar 20 is carried by the main bodies 25 of the grippers 18, by way of the pins 27 of all the bodies 25. Accordingly the control rail or bar 20 and the second control rail or bar 28 carried thereby take part synchronously in the pivotal movement of the beam 19 unless special measures are taken. In order to provide for the relative movement, which is required for pivotal movement of the grippers 18, between the beam 19 and the first control rail or bar 20, fixedly mounted on the main body 25 of at least one of the grippers 18 is a control rod 46 whose end region which is remote from the main body 25 of the respective gripper is guided in a guide means which permits axial sliding movement of the control rod 46 and which is in the form of a plain bearing 47, being connected to a shaft 50 (see FIG. 6). The shaft 50 is mounted adjustably in respect of height on the machine frame. That arrangement provides that, upon a pivotal movement of the beam 19, the body 25 of the gripper 18 and therewith the gripper 18 itself perform a pivotal movement about the pin 26 as the body 25 is guided at a spacing from the longitudinal axis of the pin 26 carrying same, by way of the control rod 46, in the bearing 47. The extent of that pivotal movement depends on the position of the bearing 47 which is to be positioned in respect of its height in such a way that, with a given stroke movement of the beam 19, the gripper 18 performs the desired pivotal movement. As the gripper body 25 shown in FIG. 4, which is connected to the control rod 46, is connected pivotably but non-slidably to the first control rail or bar 20, the pivotal movement performed by the body 25 is positively transmitted to the first control rail or bar 20 and thereby to all other grippers 18 connected thereto. That arrangement therefore provides for synchronous pivotal movements relative to the beam 19 of all grippers which are carried thereby and which are connected to the first control rail or bar 20. The same result can also be achieved by the control rod 46 being directly connected to the control rail or bar 20.

In addition, a cam wheel or disc 38 is operable to produce a longitudinal sliding movement of the second control rail or bar 28 relative to the first control rail or bar 20 which carries same. The relative movement which is caused thereby as between the two control rails or bars 20 and 28 causes opening and closing of the gripper 18.

The opening and closing movements of all grippers which are actuated by the second control rail or bar 28 also take place synchronously. The cam wheel 38 which produces the relative movement of the second rail or bar 28 relative to the first rail or bar 20 is driven by way of an offset-shaft coupling assembly 48 and 49 which permits the spacing between the cam disc 38 and the drive wheel 48 to be altered in dependence on the pivotal movements of the two control rails or bars 20 and 28.

The beam 19 carries a plurality of grippers 18 which are arranged at equal spacings from each other in the longitudinal direction thereof. The spacings of the grippers from each other correspond to the spacings of the individual stations in which the articles are carried by the holding arrangement 12. The number of grippers 18 and therewith the length of the beam 19 and the two rails or bars 20 and 28 therefore depend on the number of stations through which the articles 10 are moved by the grippers 18 in the course of their processing in the apparatus, such as the screen printing machine.

Figure 3A:
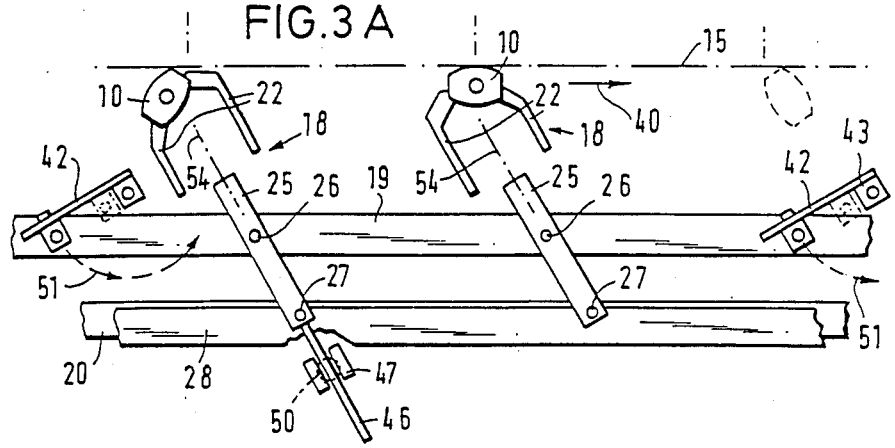

The individual operating steps occur in the following fashion:

The article to be decorated, for example printed upon, is firstly moved from a conveyor 34 as shown in FIG. 1a, which moved the article into the vicinity of the apparatus, by a particular transportation device 29 which may be for example a vacuum component, between the two holding members 12a and 12b of the holding arrangement 12, which are the first holding members in the direction of transportation of the article through the apparatus. The two holding bars 14a and 14b are at their greatest spacing from each other, in that phase of the operation. The two bars 14a and 14b are then moved into their closed position in which the holding member 12a comes into engagement with the bottom of the article such as a bottle and the holding member 12b comes into engagement with the other end of the article, for example the neck of a bottle. A treatment can then be carried out on the article in that first station. It is for example possible to check the position of the article and to align it in a given fashion in the peripheral direction so that is occupies the correct position for the following treatment operations. In that connection, articles which had already been previously introduced into the apparatus are held in all other stations of the apparatus, by the respective holding members 12a and 12b to be found thereat. At the end of the treatment step, the duration of which depends on the station or stations which involve the longest period of treatment, the articles are each gripped by a respective one of the grippers 18. The number thereof generally corresponds to the number of holder devices formed by the respective holding member 12a and 12b. On the assumption that the articles are transported in the direction of the arrow 40 through the apparatus, the grippers 18, when engaging the articles 10, take up the end position shown in FIGS. 1A and 3A and also in solid lines in FIG. 4, in which they are pivoted in the opposite direction to the transportation direction indicated by the arrow 40, that is to say, they are pivoted towards the left. By suitable displacement of the second control rail or bar 28 relative to the first control rail bar 20, all grippers are closed. Each gripper engages the article disposed in the station with which it is associated in its receiving position, as shown in FIGS. 1A and 3A and in solid lines in FIG.ure 4. Thereupon, all the holder devices formed by the respective pairs of holding members 12a and 12b are opened by the two bars 14a and 14b being moved away from each other so that now each article is carried exclusively by the gripper 18 which had previously gripped it. After the holding devices are opened, the beam 19 and the control assembly consisting of the two bars or rails 20 and 28 perform, by suitable pivotal movement of the links 42, a pivotal movement whose horizontal component is in the conveying direction 40.

Figure 3B:
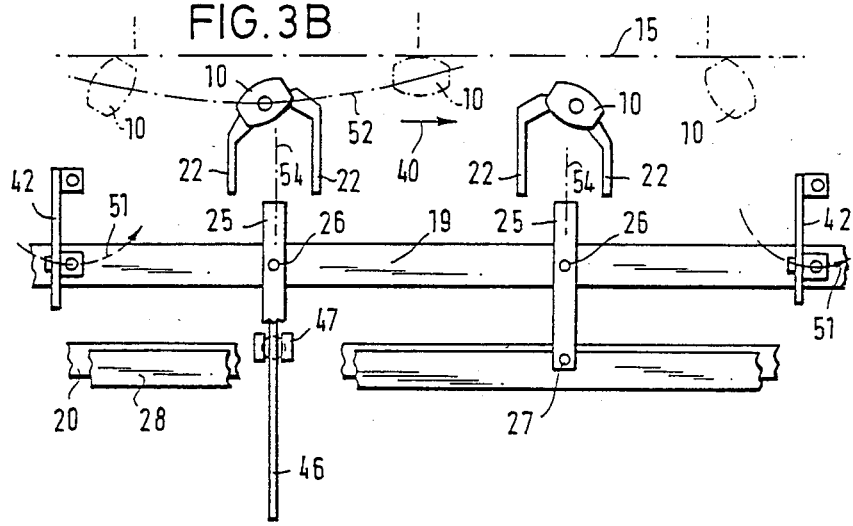
Figure 3C:
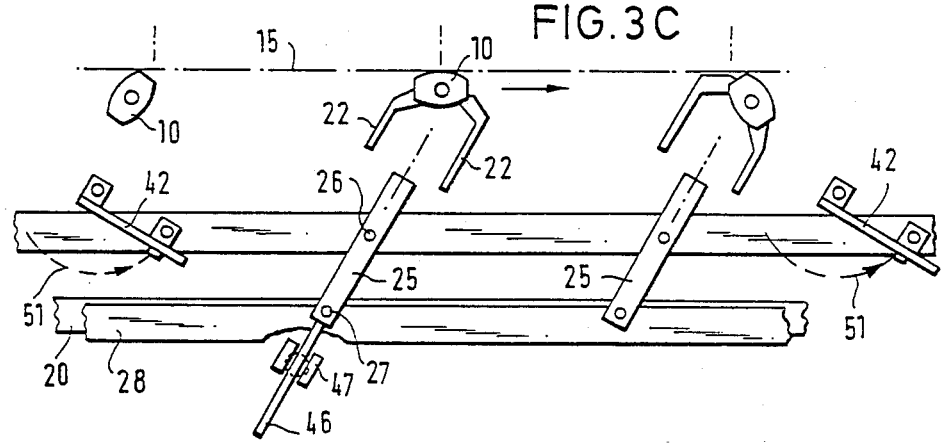

In the course of the pivotal movement as indicated by the arrows 51 in for example FIGS. 3A through 3C, the beam 19 initially experiences a downward movement until, at the half-way point, it has reached the apex as shown in FIG. 3B. Thereupon the pivotal movement of the beam 19 involves an upwardly directed component so that, at the end of the stroke movement (FIG. 3C), the beam 19 has again reached the position in respect of height at which it was to be found at the beginning of the transportation stroke movement. During that transportation stroke movement of the beam 19, which is produced by virtue of the above-outlined pivotal movement, the assembly consisting of the control rails or bars 20 and 28, by virtue of the above-described co-operation of the control rod 46 and the bearing 47, has experienced a relative displacement with respect to the beam 19, parallel to the longitudinal direction thereof, such that each of the grippers is pivoted towards the right into the position shown in FIGS. 3C and 4 (in dash-dotted lines in the latter) relative to the beam 19 carrying the gripper, about the axis of the pin 26, so that as a result each gripper 18 has been moved forward in the direction 40 by a horizontal distance whose length corresponds to the angle of the pivotal movement and the spacing between the pivot point, that is to say, the axis of the pin 26, and the ends of the two jaws 22a and 22b, which hold the respective article. Thus, in the forward transportation movement of the articles 10 in the direction indicated by the arrow 40, there are simultaneously two movements which overlap each other: on the one hand the two horizontal components of movement of the beam 19 and the gripper 18 in the direction of the arrow 40 so that the distance covered by the jaws 22a and 22b and therewith also the respective articles 10 carried thereby corresponds to the sum of the two components of the movement. On the other hand, the pivotal movement which is performed by the jaws 22a and 22b and thus also the article 10 carried thereby includes a vertical component which is directed upwardly relative to the beam 19 in the first half of the travel and which substantially compensates for the downward movement of the beam 19, which occurs in that first half of the travel, insofar as the article 10 is concerned, so that the article 10 describes a path 52 between two stations, resulting from the movements of the beam 19 and the gripper 18 carrying the article 10 (see FIG. 3B for the path of movement as indicated by reference numeral 52), which path of movement may be almost horizontal but which at any event is substantially less curved than the paths of movement described by the beam 19 and the gripper 18, when each is considered in itself.

The above-described mode of operation makes it possible for the machine components which provide for the transportation movement of the articles, namely the beam 19 and the gripper 18, to perform a markedly shorter stroke movement than the distance corresponding to the transportation movement by which each article 10 must be moved between two stations. The downwardly directed pivotal movement of the beam 19 makes it possible for the above-described pivotal movement of the gripper to be performed with an upwardly directed component of movement, without the article occupying, in the course of the transportation stepping movement, a position in respect of height which is above the plane 15 in which the decoration is applied. No particular arrangement is required in order to achieve the latter effect. It is only necessary for the stroke movements or, to put that a better way, the vertical components of the stroke movements of the beam 19 and the gripper 18, to be suitably matched and adapted to each other.

As soon as the grippers 18 have reached their right-hand end position (FIG. 3C), that is to say, have reached the station into which the article is to be transported, at the termination of the transportation step, the two holding bars 14a and 14b are brought together again with the result that the holding members 12a and 12b of each station come into engagement with the respective article 10 therein. Thereupon the grippers can be opened by suitable displacement of the second control bar or rail 20 and thereafter can be moved back into the left-hand starting position again in order there in turn to engage the articles to perform the next transportation step, after the termination of the treatment operation which is to be carried out on the majority of articles. That return movement to the starting position (FIGS. 1 and 3A) is produced by pivotal movement of the beam 19 and the grippers 18 in the opposite direction to the directions indicated by the arrows 51 and 53 respectively, in which case the grippers can remain in the open condition.

With the above-described mode of operation in which the grippers 18 perform a pivotal movement relative to the beam 19 carrying them, the article 10 which is carried by the respective gripper 18, in the course of that pivotal movement, also experiences a pivotal movement about its longitudinal axis which extends parallel to the axis of pivotal movement of the gripper. It if is assumed that, in the starting position of the gripper (FIGS. 3A and 4) in which it engages the respective article, the gripper 18 is inclined towards the left by 30° relative to the vertical so that its longitudinal centre line 54 includes an angle 56 of 30° to the vertical and the gripper, at the end of its movement, occupies the end position shown in dash-dotted lines at the right in FIGS. 3C and 4, in which its longitudinal centre line includes an angle 58 of once again 30° to the vertical, the gripper has performed a movement over an arcuate distance of 60° relative to the beam 19. When the article 10 which is to be transported and decorated in the apparatus, as shown in FIGS. 3A and 4, at the beginning of the transportation stroke movement, occupies a starting position in which the shorter axis 61 of its approximately elliptical cross-sectional configuration includes an angle of 60° to the vertical, its longer axis 62 extends horizontally at the end of the transportation stroke movement. In the next transportation stroke movement which is performed by the following gripper 18, the article 10 is again pivoted about its longitudinal axis through 60° so that is then occupies the position shown in dash-dotted lines at the right in both FIGS. 3C and 4. A necessary condition for that purpose is that the jaws 22a and 22b which directly engage the article 10 are of an arrangement and configuration corresponding to the respective position of the article in the circumferential direction thereof. The drawings show that the jaws 22a and 22b of the individual grippers are of different configurations and arrangements, in dependence on the angular position of the article. In any position of the gripper, the centre point of the development of the surface to be decorated lies in the central plane of the gripper. In the position of the article 10 in which its longer axis 62 extends horizontally, the centre point of the development of the surface to be decorated and the centre point of the article 10 are in the same plane, namely a vertical plane.

The above-described pivotal movement of the article 10 about an axis parallel to the pivot axis of the gripper 18 may be utilised particularly when printing upon articles 10 which are of non-round cross-section, being in particular approximately elliptical or oval, in order noticeably to simplify and shorten the operating movements involved in moving the article 10 in the actual decoration operation.

It may be noted at this point that, in the case of previous methods and apparatuses for decorating articles, such an article is generally transported to the treatment station in question in a position in which the longer axis of the article is parallel to the direction of transportation movement. As the article which is of such a cross-sectional configuration as mentioned above, in dependence on its cross-sectional shape and the length of the area thereon, to be decorted in the circumferential direction thereof, must first be moved into a given angular position from which the decoration operation, for example printing or applying a label, can begin, then the previous methods and apparatuses involve the necessity that, after termination of the transportation stroke movement, in the actual treatment station, a special transportation stepping movement has to be carried out, which only serves to move the article to be decorated from its position at the end of the transportation stepping movement into the starting position required for beginning the decoration operation. Referring to the positions of the articles in stations I–VII as shown in FIGS. 1A and 1B, that would mean for example that the article 10 passes from the station I in which its longer axis 62 (see FIG. 4) extends horizontally, remaining in that angular position, into the station II in which a treatment is to be carried out, during which the article is pivoted about the centre point of its development. As that pivotal movement cannot begin in an angular position in which its longer cross-sectional axis extends parallel to the direction of transportation movement, that is to say in the specific case in question horizontally, the article has to be moved in the above-mentioned special transportation step into the necessary starting position for the following treatment operation to be carried out. That starting position is to be the position that the article occupies in station II in FIG. 1B. A corresponding point also applies in regard to handling of the article at the end of the treatment process. Like the initial position, the angular position of the article at the end of the treatment process essentially derives from the cross-sectional shape of the article, the length and arrangement of the decoration on the surface to be decorated, and the configuration of that surface. In many cases, at the end of the treatment process the article will occupy a position which corresponds to its starting position, in mirror-image relationship. In other words, prior to the transportation step following the treatment, in previous apparatuses, it is generally necessary to perform a special operation for moving the article into a position which is suitable for the following transportation stepping movement.

The invention avoids these problems as, by virtue of the pivotal movements which are performed by the grippers, it is readily possible for that pivotal movement to be carried out, in dependence on the respective operating parameters and conditions involved, in such a way that for example at the end of the transportation stepping movement, the article 10 is already in the position which is necessary for the commencement of the following treatment operation, for example the position shown in broken lines in FIG. 4. It is then only necessary to adapt the angle through which the gripper 18 is pivoted to the angle at which the article is disposed at the beginning of the treatment operation, with the gripper jaws also being of a suitable corresponding configuration and arrangement. A corresponding point also applies in regard to further transportation after termination of the treatment process. The following gripper can engage and take over the article when it is still in its final position after the conclusion of the treatment operation, and can then directly thereafter carry out the following transportation step.

The above-outlined sequence of movements will now be described in greater detail with reference to FIGS. 1A and 1B:

The article 10 which in the station I occupies a position in which its longer axis 56 extends parallel to the direction of transportation movement is engaged by the gripper 18 which is the first gripper in the direction of transportation movement 40 and which for that purpose occupies its left-hand end position, with the article 10 then being transported into station II. In the course of the pivotal movement which takes place in that case, the article 10 is moved into the position shown in station II in FIG. 1B, which corresponds to the position shown in dash-dotted lines at the right in FIG. 4. In station II, the article 10 is to be subjected to a treatment, in the course of which the article is pivoted about its development centre point which is outside the cross-section of the article. That treatment may be for example a preparatory step for printing, for example a flame-treatment operation. In that case, in the course of the pivotal movement, the article also experiences a lateral displacement so that at the end of that treatment step, it is in the position shown in station II in FIG. 1B. In the course of the following transportation stepping movement, the article is again pivoted so that at the end of the transportation stepping movement it is in the angular position shown in FIGS. 1A and 1B at which, in a similar fashion to its position in station I, its longer axis is again horizontal. FIGS. 1A and 1B show that each transportation stepping movement also involves a pivotal movement which if necessary can be used to move the article without special steps in that respect, into a position in which the treatment to be carried out after the transportation stepping movement can be begun directly. In the movement from station I to station II, the article was moved into the position shown at station II in FIG. 1B, corresponding to the angular position at which the treatment operation, for example a printing operation, begins. At the end of that operation, the article is in the angular position shown in station II in FIG. 1A, in which, with a suitable arrangement and configuration in respect of the gripper jaws of the gripper which takes over the article in station II, the article can be taken over by the gripper in that position so that it can then immediately, that is to say without additional operational steps being carried out thereon, be moved into following station III in which for example it can be subjected to a treatment in which a pivotal movement of the article is not necessary. On being moved from station III into station IV in which for example the printing process is to take place, the article again experiences a pivotal movement in the course of its transportation step, which moves it into the starting position for the printing process which is shown in station IV in FIG. 1B. During the printing operation the article is pivoted into the position shown at station IV in FIG. 1A from which it can be moved into station V in the course of the next transportation stepping movement, once again directly, that is to say without additional operating procedures or operating steps being carried out thereon.

When printing articles which are of a round cross-section, the above-indicated options in regard to positioning of the article do not play an essential part as alignment of the circumferential surface of the article to be decorated relative to the means for applying the decoration, for example a labelling device or a printing stencil, can be effected by simply rotating the article about its longitudinal axis within the holding members 12a and 12b.

Reference will now be made to FIG. 11 showing the sequence of movements involved in printing on a round article, an oval article and a flat article. In all three cases, the squeegee or doctor 17 is stationary and the screen printing stencil 6 is displaceable relative to the squeegee. In case (a) which involves printing on articles 10 which are of circular cross-section, the article does not involve any lateral displacement. Only the screen printing stencil is displaced.

In case (b) which involves printing on articles 10 which are approximately elliptical in cross-section, at the beginning of the printing operation the article occupies the position shown at the top in FIG. 11b, corresponding to the positions in stations II and IV in FIG. 1B. After the surface 66 to be printed has been rolled along against the screen printing stencil 16, the article 10 is in the position shown at the bottom in FIG. 11b, in which it has been displaced by a distance towards the left relative to the starting position. That position corresponds to the position in stations II and IV in FIG. 1A.

Case (c) in FIG. 11 represents the movements involved when printing on flat articles 10 which are not rolled against the screen printing stencil. In this case also however there is lateral displacement of the article 10 from the position at the beginning of the printing operation into the position at the end thereof. As in case (b), at the beginning of the printing operation or other treatment operations in which such a lateral displacement is also necessary or desirable, the article occupies a position which is somewhat displaced laterally relative to the middle of the respective treatment station. At the end of the treatment operation the article is in a position in which it is displaced relative to the middle of the station in the opposite direction. The two bottom views in each of FIGS. 11a, 11b and 11c show that if necessary the screen printing stencil can also be displaced in the opposite direction, with the movements admittedly taking place in the opposite fashion, but in other respect remaining unaltered.

Figure 8:
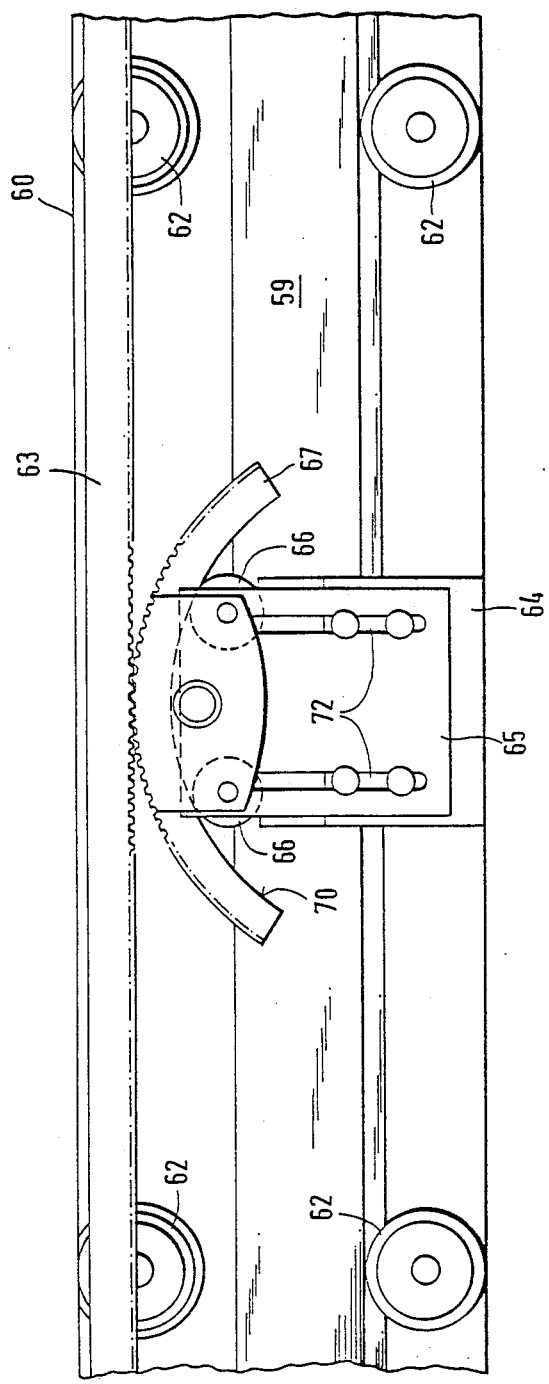
FIG. 8 is a view in section taken along line VIII—VIII in FIG. 7.

Reference will now be made to FIGS. 7 and 8 showing the mounting of the holding members 12a and 12b on the holding arrangement 12 for dealing with articles which are of approximately elliptical cross-section. Each of the two holding bars 14a and 14b which are not shown in FIGS. 7 and 8 is provided with a stationary guide rail or bar 59 carrying a carriage 60. The carriage 60 is provided with guide rollers 62 for guiding the carriage 60 on the guide rail 59. Mounted on the carriage is a longitudinally extending toothed bar or rack 63. In the stations in which treatment operations are carried out on the articles 10, secured to each guide rail 59 is a support 64 on which a carrier element 65 is mounted adjustably in respect of height. For the purposes of easy adjustability, the carrier element 65 is provided with slots 72 through which screws can be secured into the support 64 in order to clamp the element 65 to the mounting 64 in the respective position required.

When decorating articles which are of a substantially oval or elliptical cross-section and in which therefore the centre point of the radius of the curved surface to be printed does not coincide with the centre point of the article, the carrier element 65 carries two guide rollers 66 which are arranged at a lateral spacing from each other and which carry and guide a curved rack portion 67. The teeth of the rack portion 67 are disposed on the top side thereof. The element 65 which carries the guide rollers 66 is set in regard to its heightwise position in such a way that the guide rollers 66 hold the rack portion 67 in a position in which its teeth on the top thereof mesh with the teeth on the underside of the rack 63.

The curved rack portion 67 carries the respective holding members 12a and 12b. The connection between the rack portion 67 and the holding member 12a which holds the bottom of a bottle 10 is made by way of a pin 69 which extends perpendicularly to the plane of movement of the rack portion 67. The curvature thereof is such that the configuration of the teeth carried thereby corresponds to the configuration of the surface to be decorated on the article 10.

The position of the components shown in FIGS. 7 and 8 corresponds to the positon thereof for example after half the decoration has been applied to the surface to be decorated. It is assumed that the decoration to be applied is applied to the surface symmetrically in the circumferential direction thereof.

The lower surface of each rack portion 67, which is remote from the teeth thereof, is smooth so that the two guide rollers 66, the peripheral surfaces of which are also smooth, can roll there-against. It is important for the lower boundary surface 70 of the rack portion 67 to be arranged in an inclined position in such a way that the thickness of the rack portion increases somewhat towards the rear from the front thereof, that is to say the side thereof which is towards the holding member 12a for holding the bottom of the article or bottle 10, so that the rack portion 67 is of a wedge-shaped or tapering configuration in cross-section. To provide for satisfactory guidance by means of the two guide rollers 66, that presupposes that the peripheral surfaces thereof also extend in a correspondingly inclined fashion. That can be achieved either by the two guide rollers 66 being of a suitable tapering configuration, or by the guide rollers being mounted in a correspondingly inclined position. In the case of the embodiment illustrated, it is the second option that has been employed a that makes it possible to use conventional roller members for the guide rollers 66, which are cheaper than tapering rollers. The above-described configuration provides that the rack portions 67 are positively held in their respective positions by the associated guide rollers 66 without special and expensive steps being required for that purpose, so that the rack portions 67 cannot be drawn forwardly, that is to say, towards the article 10, from their respective positions as shown in FIG. 7. At the other side each rack portion 67 bears against the respectively associated carriage 60 so that it can be easily secured against displacement in both directions transversely with respect to the longitudinal axis thereof. In addition the lower inclined boundary and guide surface 70, co-operating with the guide rollers 67, causes the production of a component of force which tends to move the rack portin 67 towards its position of abutment against the carriage 60.

In order to perform a treatment operation in which the article 10 has to be pivoted about the development centre point, the rack portions 67 are firstly displaced by means of a suitable longitudinal displacement of the associated rack 63 into the starting position for the treatment process, wherein the mounting member 12a, as it is fixedly connected to the rack portion 67 by way of the pin 69, is also correspondingly laterally displaced and at the same time pivoted. The holding members 12a and 12b in the receiving position therefore occupy the position shown in stations II, IV and VI in FIG. 1B, corresponding to the position of the cross-section of the article 10 to be received by the holding members 12a and 12b. By the two holding members 12a and 12b being moved in opposite relationship to each other, the article is gripped between two holding members and released by the gripper which had moved the article into the corresponding position and held it there hitherto. The treatment operation now takes place. For that purpose the racks 63 are displaced by a distance whose length is governed for example by the dimension of the decoration to be applied in the circumferential direction of the article to be decorated. The longitudinal displacement of the racks 63 also causes pivotal movement of the rack portions 67, in which respect, by virtue of the above-described arrangement with the rack portions 67, the article 10 performs a corresponding pivotal movement which also includes a horizontal, that is to say, lateral, component. During that pivotal movement for example decoration can be applied to the article 10. At the end of that movement the holding members 12a and 12b and the article 10 therein occupy the position shown in stations II, IV and VI in 1A, in which the article is gripped in the above-described manner by the gripper 18 so that, after the two holding members 12 and 12b have been moved apart and have thus released the article, the gripper can transport the article 10 to the following station. The holding members 12a and 12b can then be returned to the starting position to receive the next article.

Figure 9:
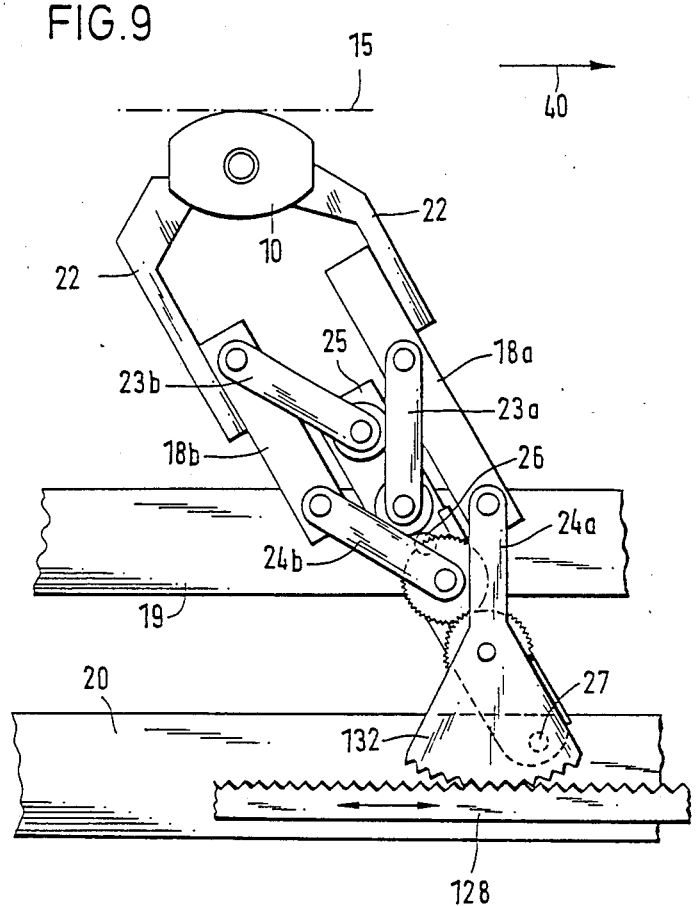
FIG. 9 is a view corresponding to that shown in FIG. 5, of another embodiment of a gripper.
Figure 10:
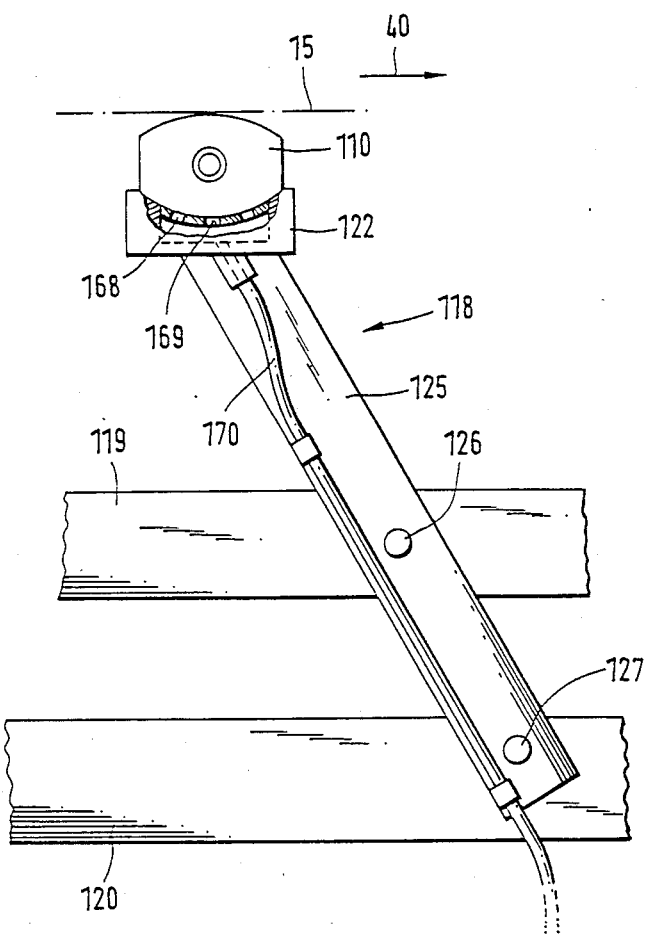
FIG. 10 is a view corresponding to that shown in FIG. 5, of another embodiment of a carrier element, and FIGS. 11a, 11b, and 11c provide a graphic representation of the movements of the components which cooperate in a printing station, when dealing with articles of different cross-sectional shapes.

Referring to FIG. 9, shown therein is a gripper 18 which, instead of a fork 32 and a pin 33 on the second control rail or bar 28 has a toothed segment 132 meshing with a rack 128 which performs the function of the second controlrail or bar 28 described above. In other respects the FIG. 9 assembly is the same as the configuration of the gripper shown in FIG. 5. In FIG. 10, the arrangement includes a carrier element 118 which is in the form of a vacuum holder. It essentially comprises an elongate support body 125 mounted pivotably on a beam or bar 119. At its end towards the holding means, the body 125 is provided with a mounting 122 whose side which is towards the plane 15 of the screen printing stencil is delimited by a wall portion 168 whose cross-sectional shape is adapted to the shape of the article 110 to be transported thereby. The wall portion 168 has openings 169 therethrough, which can be connected to a reduced pressure source by way of a hose 170. The connection between the support body 125 and the beam 119 is made by way of a pin 126, as in the case of the above-described gripper constructions. The connection to the control rail or bar 120 which is also required in this case is made by way of a pin 127. The second control rail or bar which is provided when using the above-described gripper constructions is omitted as, instead of the opening and closing movements of the gripper, the embodiment shown in FIG. 10 involves cutting in and cutting out the reduced pressure for holding the article 110 in position, by way of the hose 170. In other respects the embodiment shown in FIG. 10 also involves the operating procedures and movements described above in connection with the grippers.

In a modification of the arrangement illustrated in the drawings, it is also readily possible for the articles to be treated as by printing, labelling or the like, in an upright position. It would then only be necessary to arrange the holding members 12a and 12b in a vertical plane or if necessary another plane, with the treatment stations being positioned laterally therebeside. The beam 19 and the carrier elements 18 can then perform their pivotal movements in a horizontal plane or an inclined plane, corresponding to the position of the articles.

The invention therefore afforeds the option of adapting the apparatus and the decoration operation to the respective cross-sectional shape of the articles so that the apparatus can be used without significant restriction, in regard to the cross-sectional shape of the articles. When printing on articles which are of approximately elliptical cross-section and in which the centre point about which the article is pivoted during the decoration operation does not coincide with the centre poin of the article, the apparatus of the invention affords the simplification that the lateral movement of the article which is necessary in connection with the decoration operation is reduced in size so that overall the apparatus of the invention can be of a shorter construction than previous designs. Furthermore, the plane in which the decoration operation takes place, involving for example a label coming into contact with the circumferential surface of the article or the screen of a screen printing machine coming to bear against the article, does not need to be altered in respect of its heightwise position, in order to adapt the apparatus to the respective operating parameters involved, such as more particularly the diameter of the respective articles to be decorated. On the contrary, the necessary adjustment for the purpose of adapting the apparatus to the respective diameter of the articles in question is achieved by suitable adjustment of the holding arrangement and the transportation arrangement.

It will be appreciated that the invention is also not restricted in regard to the utility thereof to printing machines and in particular screen printing machines. On the contrary the invention can be used wherever, for the purposes of decoration and other treatment operations involved therewith, articles can be transported and handled in respect of the operating movements to be effected thereby in the above-described manner.

It will be further appreciated that the above-described constructions have been set forth solely by way of example and illustration of the principles of the present invention and that various other modifications and alterations may be made therein without thereby departing from the spirit and scope of the invention.

What is claimed is:

1. Apparatus for decorating articles comprising at least one first station for an operation to be performed on respective articles passing through the apparatus, at least one second station disposed at a spacing from the first station in the direction of transportation of the articles through the apparatus, for carrying out a further operation on the articles, at least one said station being provided with at least one means for applying decoration to the articles, a holding arrangement for carrying the articles in the stations and comprising holding members co-operable in pairs to form at least two holding devices for holding the articles in the respective stations, the holding members being reciprocable parallel to the longitudinal axis of the articles for selectively engaging and releasing same, and a transportation means for transporting the articles stepwise from one said station to another and comprising: at least one main support member, means mounting said main support member pivotably in a plane substantially perpendicular to the longitudinal axis of the articles carried by said holding members, at least one carrier means pivotably mounted on said main support member and projecting therefrom towards said holding arrangement and pivotable with the pivotal movement of the main support member and means for producing pivotal movement of said carrier means, whereby the stroke movement of the main support member in the said direction of transportation and the stroke movement of the carrier means in said direction of transportation supplement each other to make up a distance by which a said article is advanced from the first station in which it is carried by said holding members thereof to the second station in which it is carried by the further said holding members thereof.

2. Apparatus as set forth in claim 1 including means for adjusting the stroke movement of the main support member.

3. Apparatus as set forth in claim 1 including means for adjusting the stroke movement of the carrier means.

4. Apparatus as set forth in claim 1 wherein said main support member carries at least first and second said carrier means disposed at a spacing from each other in the longitudinal direction of the main support member, and wherein the spacing between successive carrier means is adapted to the spacing between said holding devices between which a respective said article is to be advanced in a transportation step.

5. Apparatus as set forth in claim 1 and further including at least one control element operatively associated with the main support member and displaceable relative thereto, and means connecting said control element to at least one of said carrier means whereby said control element is operable to control the pivotal movement of the carrier means in dependence on the pivotal movement of the main support member.

6. Apparatus as set forth in claim 5 wherein said control element for controlling the pivotal movement of said carrier means comprises a bar.

7. Apparatus as set forth in claim 6 wherein said bar is arranged at the side of the main support member which is remote from said holding arrangement.

8. Apparatus as set forth in claim 6 wherein all the carrier means to be controlled by said control bar are provided at their side remote from said holding arrangement with an extension portion pivotally connected to the control bar, connected to at least one pivotably and longitudinally slidably mounted control rod.

9. Apparatus as set forth in claim 6 and further including a second control bar wherein said carrier means is in the form of a gripper comprising a support body mounted on said main support member pivotably in a plan parallel to the plane of movement thereof, first and second gripper jaws carried by said support body, means at a location spaced from said gripper jaws mounting said support body to said first control bar pivotably relative thereto, first and second mutually intermeshing gears mounted on respective first and second shafts carried by said support body, a double-armed lever non-rotatably connected to said first shaft and connected by one arm pivotably to said second control bar and by the other arm to one of said gripper jaws, and a lever non-rotatably connected towards one end to the said second shaft carrying said second gear and pivotably connected towards its other end to the other gripper jaw.

10. Apparatus as set forth in claim 9 wherein the end remote from said gripper jaws of said one arm of said double-armed lever pivotally connected to said second control bar is of a forked configuration, and wherein said second control bar carries an entrainment portion adapted to engage into said fork configuration.

11. Apparatus as set forth in claim 1 wherein said carrier means is operable to transfer a respective said article at the end of a transportation step to the holding members in a subsequent station in a position corresponding to the position of the article for the beginning of the operation to be carried out thereon following said transportation step, during which operation said article is carried by the further said holding device in said subsequent station.

12. Apparatus as set forth in claim 1 wherein before the beginning of a transportation step the carrier means holds a respective article from the respective holding device in a position corresponding to the position of the article at the end of the operation preceding said transportation step.

13. Apparatus as set forth in claim 1 wherein said main support member comprises a beam.

14. Apparatus as set forth in claim 1 wherein said carrier means comprises a gripper means.

15. Apparatus as set forth in claim 1 wherein said carrier means comprises a vacuum holding means.

16. Apparatus as set forth in claim 1 wherein said main support member is adapted to perform a reciprocating movement along a curved path whose apex is at the point on the path which is furthest away from the plane in which said holding members are disposed, and the pivotal movement of the carrier means during a transportation step is adapted to the movement of said main support member in such a way that the change in position of said carrier means is adapted to the pivotal movement of the main support member whereby said change in position of said carrier means perpendicularly to the plane of the holding members during the pivotal movement is at least partially compensated by an opposite change in the position of said main support member.

17. Apparatus as set forth in claim 1 wherein said article holding arrangement comprises first and second holding bars extending in at least substantially parallel relationship to said main support member, the holding members of each said pair being disposed at the mutually facing sides of said holding bars.

18. Apparatus as set forth in claim 17 wherein said holding bars are arranged above said main support member.

19. Apparatus as set forth in claim 17 and further including a carriage mounting at least some of said holding members on said holding bars.

20. Apparatus for decorating articles comprising: at least first and second operating stations for performing working operations on respective articles passing through the apparatus, the first and second stations being disposed at a spacing from each other in the direction of transportation of the articles through the apparatus; holding means at each of said stations for holding the respective articles in the stations while said working operations are carried out thereon, each said holding means comprising first and second holding members co-operable in pairs to hold a respective said article therebetween and means for displacing the holding members of each pair in a direction at least substantially perpendicular to said direction of transportation of the articles, for selectively holding and releasing said articles; and transportation means for transporting the respective articles from one station to the next in said direction of transportaton of the articles and including at least one main support member, means mounting said main support member movably in a plane which is substantially in said direction of transportation of the articles, means for moving said main support member in said plane, carrier means pivotably mounted on said main support member and including a portion projecting from said main support member towards the respective said holding means and operable to engage a said article for transporting same with a step-wise movement from one said holding means to an adjacent said holding means, and control means for producing pivotal movement of said carrier means on said main support member in conjunction with said reciprocating movement of said main support member whereby the stroke movement of said carrier means in said direction of transportation and said movement of said main support member in said direction of transportation supplement each other to make up the distance by which a said article is advanced from the holding means in one said station to the holding means in another adjacent station.

* * * * *